(12) United States Patent
Morikawa

(10) Patent No.: US 6,257,861 B1
(45) Date of Patent: Jul. 10, 2001

(54) APPARATUS FOR STRETCHING BREAD DOUGH

(75) Inventor: Michio Morikawa, Utsunomiya (JP)

(73) Assignee: Rheon Automatic Machinery Co., Ltd., Tochigi-ken (JP)

( * ) Notice: Subject to any disclaimer, the term of this patent is extended or adjusted under 35 U.S.C. 154(b) by 0 days.

(21) Appl. No.: 09/294,913

(22) Filed: Apr. 19, 1999

(30) Foreign Application Priority Data

Apr. 28, 1998 (JP) .................................................. 10-132560

(51) Int. Cl.$^7$ ........................................................ A21C 3/02
(52) U.S. Cl. ............................................. 425/363; 425/372
(58) Field of Search .................................... 425/363, 373, 425/372

(56) References Cited

U.S. PATENT DOCUMENTS

| | | | | |
|---|---|---|---|---|
| 4,880,375 | * | 11/1989 | Hayashi | 425/363 |
| 5,154,941 | * | 10/1992 | Hayashi | 425/363 |
| 5,783,218 | * | 7/1998 | Morikawa | 425/363 |
| 5,804,225 | | 9/1998 | Hayashi | 425/363 |
| 6,036,909 | * | 3/2000 | Baum | 425/373 |

FOREIGN PATENT DOCUMENTS 7-317211    11/1995 (JP) ................................. A21C/3/02

* cited by examiner

*Primary Examiner*—Robert Davis
*Assistant Examiner*—Thu Khanh Nguyen
(74) *Attorney, Agent, or Firm*—Finnegan, Henderson, Farabow, Garrett & Dunner, L.L.P.

(57) ABSTRACT

An apparatus is provided for stretching bread dough and the like comprising a rotating member that includes a plurality of planetary rollers that revolve along a circular orbit, a conveying device provided below said rotating member such that a first gap is provided, said first gap gradually decreasing from an inlet to an outlet for the bread dough, said conveying device including a plurality of rollers adapted so that the speed at which each roller rotates gradually increases from said inlet to the outlet for bread dough, and an arcuate plate provided below the rotating member and downstream of the plurality of rollers such that a second gap in which the bread dough is pressed by the plurality of rollers.

3 Claims, 5 Drawing Sheets

APPARATUS FOR STRETCHING BREAD DOUGH

BACKGROUND OF THE INVENTION

1. Field of the Invention

This invention relates to an apparatus for stretching a highly elastic material such as bread dough, and particularly to an apparatus for stretching bread dough that is continuously supplied by a conveyor, so as to form a thin and continuous sheet of bread dough, by simply applying vibrations, thereby easily forming a high-quality sheet of bread dough with a constant thickness and uniform inner layers.

2. Prior Art

To stretch elastic materials, a stress higher than their yield point has customarily been applied to them. However, the elasticity thus lost has not been automatically recovered. Therefore, in producing food, especially bread that requires elasticity as an important quality, a skilled manual operation has always been necessitated.

When bread is automatically produced by machinery, maintaining the elasticity of the bread dough is always considered troublesome. Moreover, if even a little of the elasticity is lost, it is difficult to produce bread having a taste like that in bread made by a skilled artisan. Therefore, potassium bromate and the like have been mixed in the material as chemical additives, and the stretched bread dough has then been put in a rest condition so that the elasticity (membrane-forming function) lost due to the machinery could be recovered.

Thus, the conventional method of stretching bread dough caused its inherent elasticity to be partly lost. Further, the twisting stress caused by any screw mechanism has been imparted to the bread dough, and has broken the gluten's gel structure so as to also cause the elasticity to be partly lost. To recover it, the chemical additives were added to the bread dough. However, as compared with the taste of manually-prepared bread, an inferior taste was obtained. In any event, using the chemical additives was an unnatural resolution of the problem.

Therefore, the applicant disclosed in U.S. Pat. No. 5,804,225 an invention entitled "A Stretching Method and Apparatus" wherein highly viscous and elastic dough can be stretched into a thin sheet of dough (Japanese Patent Application 7-317211). It discloses an apparatus for stretching dough by planetary rollers that revolve along a circular orbit while rotating about their own axes. Below the rollers a conveying device is provided to provide a curved gap between the rollers and the device, the gap being gradually narrowed from the inlet to the outlet for the dough. The conveying device comprises a plurality of rollers and is adapted such that the peripheral speed of the rollers is gradually increased from the inlet to the outlet for the dough.

It was found that this apparatus can sufficiently stretch bread dough even when it has a high viscosity and high elasticity. However, the conveying device comprises only a plurality of rollers. Namely, due to a space between adjacent rollers, no continuous and generally flat conveying surface is provided. Therefore, a part of the bread dough tends to hang between the adjacent rollers. Thus, a sufficient stretching of the bread dough cannot be attained. This leads to a wrinkled sheet of bread dough. In other words, the poor stretching by this apparatus causes the dough to wrinkle, and thus a sufficiently uniform and sufficiently thick sheet of bread dough is not obtained.

SUMMARY OF THE INVENTION

The object of this invention is to provide an apparatus for stretching dough having a high viscosity and high elasticity into a thin sheet of dough. This apparatus can easily and effectively stretch such bread dough into a high-quality one having a uniform thickness and uniform inner layers.

After having discussed ways to resolve the above problem, the inventor found that if at the part of the outlet for bread dough of the conveying device that includes a plurality of rollers of the apparatus disclosed in U.S. Pat. No. 5,804,225 an arcuate plate is provided in place of a roller or rollers, the bread dough can be effectively and uniformly stretched on the plate by the planetary rollers. This results in homogeneous bread dough having a uniform thickness and inner layers that do not include any large bubbles. This finding led to completing this invention.

Thus, this invention provides an apparatus for stretching bread dough and the like comprising: a rotating member that includes a plurality of planetary rollers that revolve along a circular orbit, each roller being freely rotatable about its axis, a conveying device provided below said rotating member such that a first gap in which dough is pressed is provided, said first gap gradually narrowing from an inlet for bread dough to an outlet for it, said conveying device including a plurality of rollers, and a speed-setting device for individually controlling the speed that some of the rollers of the plurality of rollers of the conveying device rotate such that the speed that the plurality of rollers of the conveying device rotate gradually increases from the upstream end to the downstream end, characterized by: an arcuate plate provided below said rotating member and downstream of said plurality of rollers such that a second gap in which the bread dough is pressed is provided.

The freely rotatable rollers that travel along the circular orbit of this invention periodically vibrate the bread dough so as to generate a temporary fluid phenomenon that is called a thixotropic effect. During the short period when this effect appears, the bread dough is stretched by means of "tensile stress," so as to produce a continuous sheet of bread dough with its gel structure unbroken. This sheet of bread dough can be wound up to make a roll of continuous rod-like bread dough having a diameter that can be varied. This sheet can be cut into a predetermined length so as to thereafter complete the dividing stage of the sheet of bread dough.

The fluid property, which is one of the effects of the thixotropy, is reversible. Therefore, the bread dough that is stretched to be thin that employs this effect tends to recover its original elasticity within a few minutes after it is put in a rest condition. Therefore, as compared with the conventional dividing method, where the elastic structure is broken, the apparatus of this invention can produce a sheet of dough that is stretched to be thin by the use of the thixotropic effect, without losing the membrane-forming function.

The conveying device of this invention includes an arcuate plate positioned below the rotating member and downstream of a plurality of rollers such that a second gap in which bread dough is pressed by the planetary rollers is provided. The arcuate plate provides a continuous and generally flat conveying surface. Thus, the bread dough can be effectively and uniformly stretched on the arcuate plate by the planetary rollers. This results in a predetermined sheet of bread dough having a desired thickness. Further, the inner layers of the bread dough are also homogeneous and have no large bubbles.

PREFERRED EMBODIMENTS OF THE INVENTION

By reference to the drawings, below the two embodiments of this invention will be explained. However, it should be understood that this invention should not be limited to them.

Figure 1:
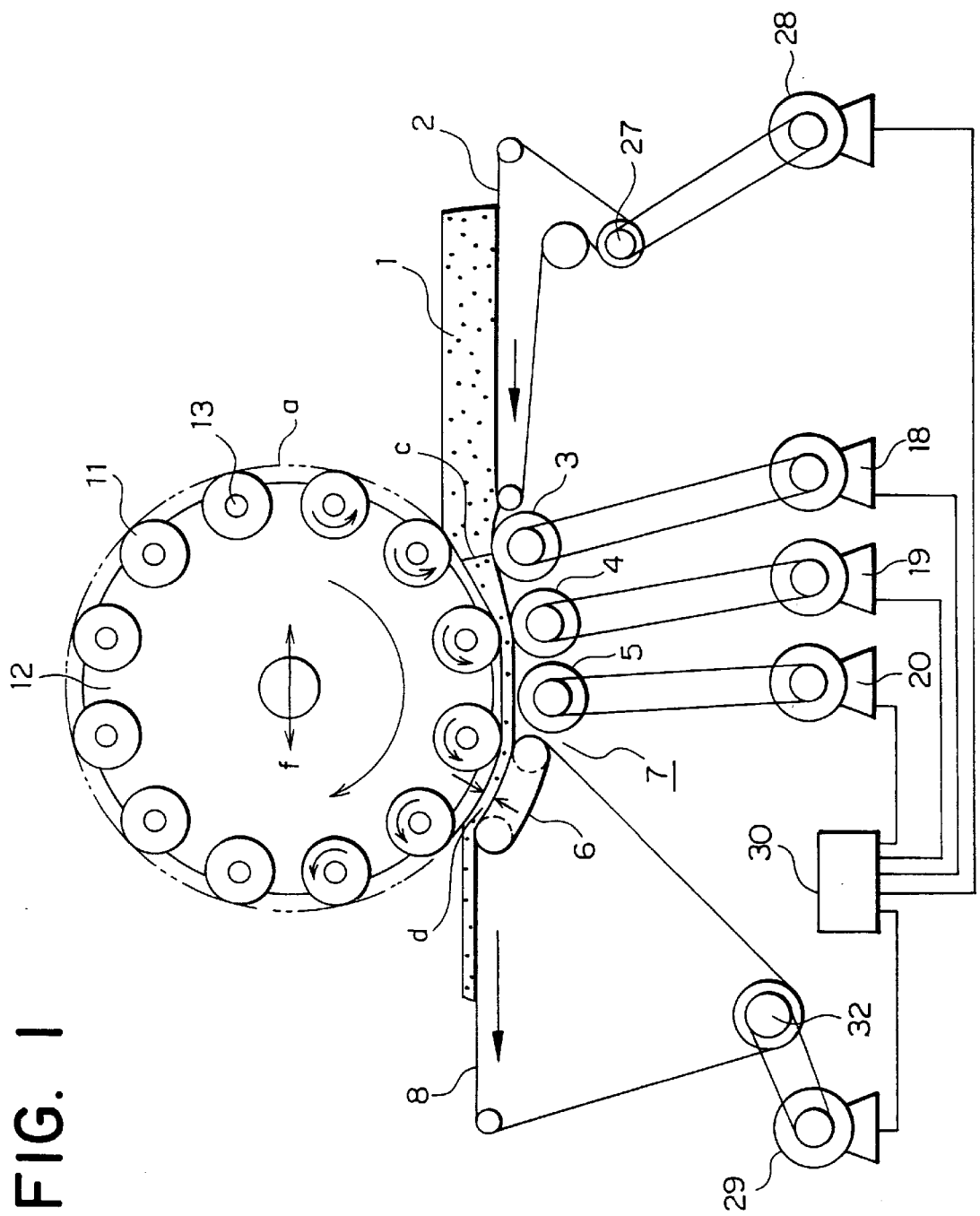
FIG. 1 shows a side view of the first embodiment of the present invention.

In FIG. 1, a conveying device 7 is provided. It includes a supply conveyor 2 to convey bread dough 1, a plurality of rollers 3, 4, and 5, and an arcuate plate 6 that is positioned downstream of the roller 5. The supply conveyor 2 is adapted to be driven by means of a pulley 27 by a motor 28. The speed that the motor 28 rotates can be adjusted by an inverter 30. A discharge conveyor 8 is adapted to be driven by means of a pulley 32 by a motor 29. The belt of the conveyor 8 can slide on the surface of the plate 6. The speed that the motor 29 rotates can also be adjusted by the inverter 30.

Figure 4:
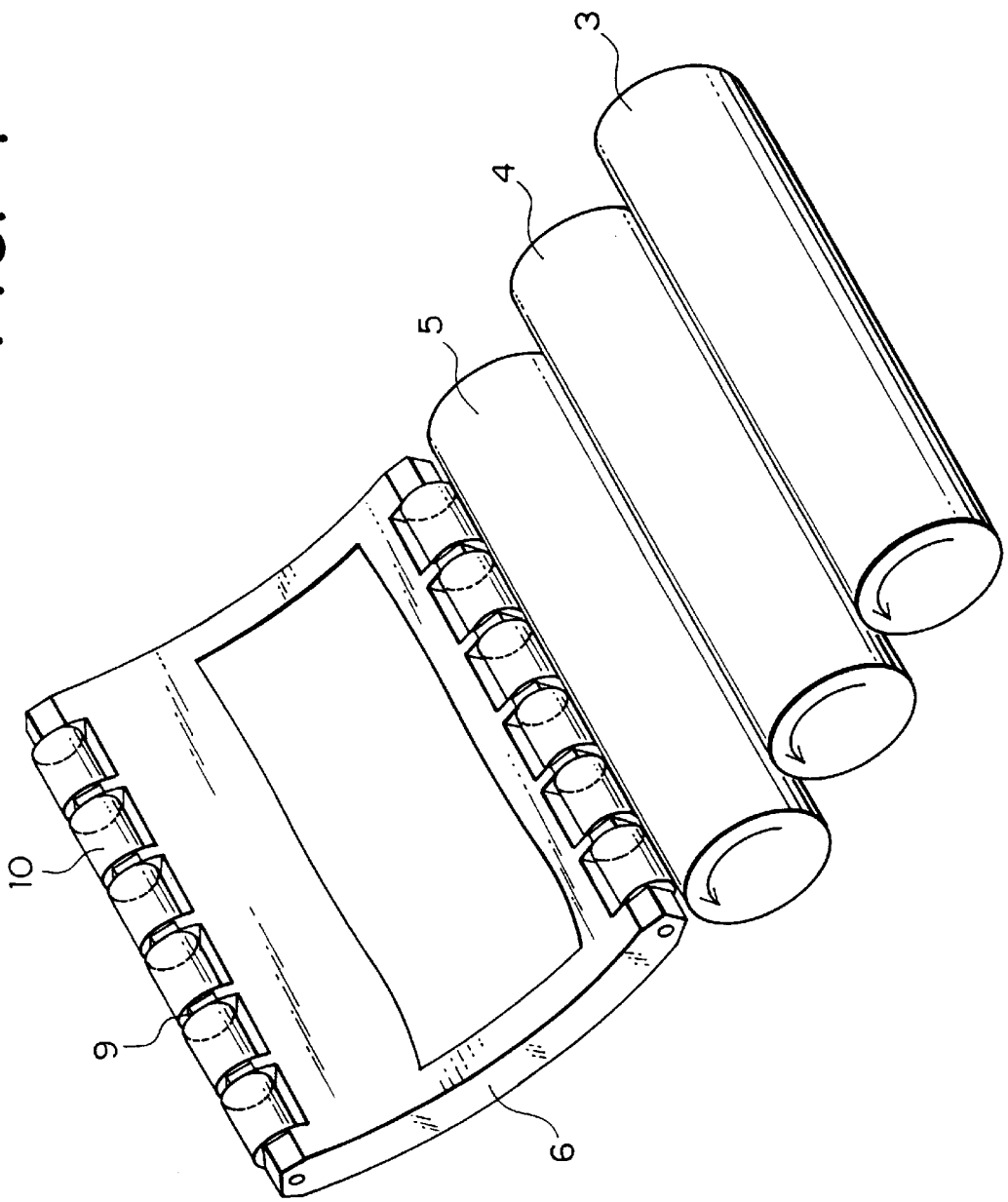
FIG. 4 shows a perspective view of an arcuate plate positioned downstream of the plurality of rollers.

As shown in FIG. 4, the arcuate plate 6 has shafts 9,9, provided at both the front and back edges of the plate. A plurality of cylindrical bodies 10 are freely and rotatably mounted about the shafts 9,9. The cylindrical bodies 10 function such that the discharge conveyor 8 can be smoothly actuated.

The number of rollers can be increased from 3 to 5. In that case the length of the plate 6 can be decreased in response to the kind of bread dough to be stretched.

Above the conveying device, a plurality of planetary rollers 11 are provided. At least one of them is adapted to move above the arcuate plate 6.

The planetary rollers 11 are freely and rotatably mounted about shafts 13, which are securely mounted on a wheel 12. The shafts 13 are arranged so as to be parallel to the conveying device 4. Therefore, the planetary rollers 1 can be positioned parallel to the conveying device 7.

The wheel 12 is securely mounted on a drive shaft 15, which is supported by a frame 14. The wheel 12 can be rotated through a gear device 16 by the drive of a motor 17.

The planetary rollers are moved on the surface of the bread dough 1 while they are rotated to stretch it to be thin. A gap (c) is provided between an imaginary circle (a) described by the peripheries of the planetary rollers 11 and the rollers 3, 4, and 5. The gap (c) is arranged so as to decrease from the upstream end to the downstream end. Further, a gap (d) is provided between the imaginary circle (a) and the arcuate plate 6. At the gaps (c) and (d), the bread dough 1 is stretched by the planetary rollers 11.

The length of the arcuate plate 6 and the values of the gap (d) can be optionally changed in response to the characteristics of bread dough, such as the degree of elasticity. For example, the gap (d) can be set so as to be gradually increased or decreased from the upstream end to the downstream end, or to remain constant.

The rollers 3, 4, and 5 are rotated through drive shafts (not shown) by the motors 18, 19, and 20, respectively, in the downstream direction. The speed of the rotating members of the motors can be adjusted by means of the inverter 30. The speed that each of the motors 18, 19, and 20 rotates can be adjusted individually by the inverter 30 acting as an adjusting device. Therefore, the speeds at which the rollers 3, 4, and 5 rotate can be adapted so that they can be gradually increased downstream.

As stated above, in this embodiment the speeds at which the rollers 3, 4, and 5 rotate are gradually increased in the conveying direction. The increase in the speeds that the rollers rotate can be set inversely to the degree that the gap (c) in the downstream direction decreases.

The decreasing size of the gap (c), namely, the compression rate, can be changed in response to the characteristics of the bread dough to be stretched, by changing the gap (c). For example, by manually turning a handle 21, the wheel 12 can be readily moved in the direction (f).

The speed of the supply conveyor 2 is set to be the same as or less than that of the roller 3. The speed of the discharge conveyor 8 is set to be the same as or more than that of the roller 5.

The rollers 11 can be disposed so that the distance between adjacent planetary rollers 11 is twice the distance between adjacent rollers 3 and 4, or rollers 4 and 5. This arrangement allows the generatrix of the planetary roller 11 and the generatrices of the rollers 3, 4, and 5 to generally and simultaneously oppose each other.

Bread dough 1, being conveyed by the supply conveyor 2, is supplied to the conveying device 7. The bread dough 1 is stretched between the plurality of planetary rollers 11 and the plurality of rollers 3, 4, and 5, the speeds at which they rotate being in turn higher from upstream to downstream. The thickness of the bread dough 1 is then made uniform on the arcuate plate 6 by the turning of the planetary rollers 11. The uniformly-shaped bread dough 1 is then discharged by the discharge conveyor 8.

When the planetary rollers 11 pass above the rollers 3, 4, and 5, the planetary rollers 11 apply violent and repeated vibrations to the bread dough 1 so as to alternately compress and decompress it. This results in the thixotropic effect being generated, so that elastic bread dough having low fluidity at normal conditions temporarily becomes one that has a high fluidity.

Bread dough 1 having a high fluidity can be readily stretched because of the different speeds that the rollers 3, 4, and 5 rotate.

When the planetary rollers 11 pass above the rollers 3, 4, and 5 they are adapted such that they oppose the rollers 3, 4, and 5 and such that the generatrices of the planetary rollers 11 and the generatrices of the rollers 3, 4, and 5 are allowed to coincide with each other at two locations at least. This results in a difference in the speeds of the peripheries of the two compressing portions. This leads to more effectively and thinly stretching the bread dough.

The variations in the speed that the wheel 12 rotates cause the optional adjustments of the beating effect (the thixotropic effect). Thus, the stretching ratio for the bread dough 1 and a desired production rate can be adjusted.

The thickness of the stretched bread dough 1 is then made uniform on the arcuate plate 6 by the planetary rollers 11. Thus the uniformity of the bread dough 1 is enhanced and the stretching efficiency given to it can be improved. If the arcuate plate 6 is not provided, the bread dough 1, which is stretched because of the different speeds that the rollers 3, 4, and 5 rotate, will not become uniform. This is because the bread dough 1 has not been subjected to a uniform compression by the cooperative action of the arcuate plate 6 and the planetary rollers 11. Thus, wrinkled bread dough will be produced. Further, if the arcuate plate 6 is not provided, the bread dough stretched between the planetary rollers 11 and the rollers 3, 4, and 5 tends to shrink on the discharge conveyor 8 due to the elasticity of the bread dough 1, which is an inherent property of bread dough. Therefore, the stretched bread dough 1 will become one having an increased thickness, resulting in bread dough undesirably thick.

However, when the stretched bread dough 1 is made uniform on the arcuate plate, which has a continuous and generally flat conveying surface, no wrinkled or shrunk bread dough will be produced, so that a desired thickness of bread dough can be readily obtained.

Figure 2:
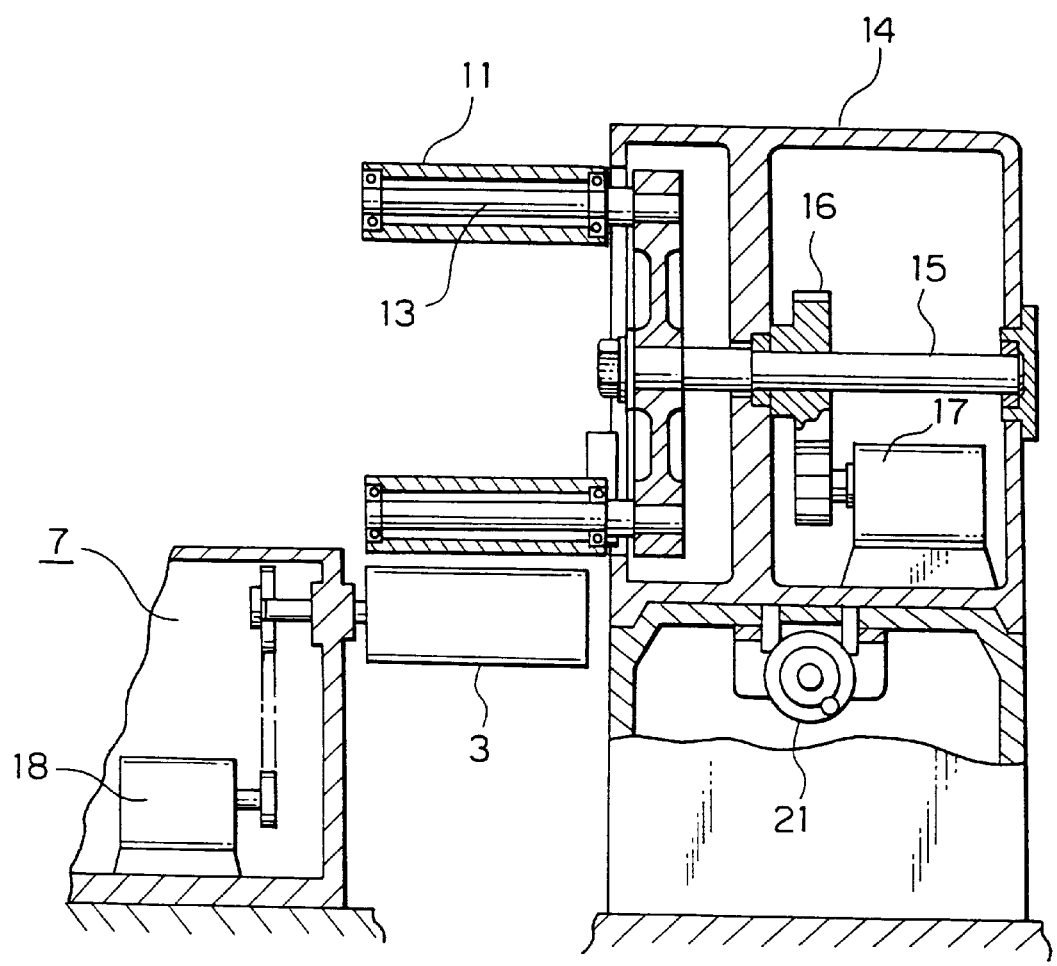
FIG. 2 shows a front view in cross section of the first embodiment of the present invention.
Figure 3:
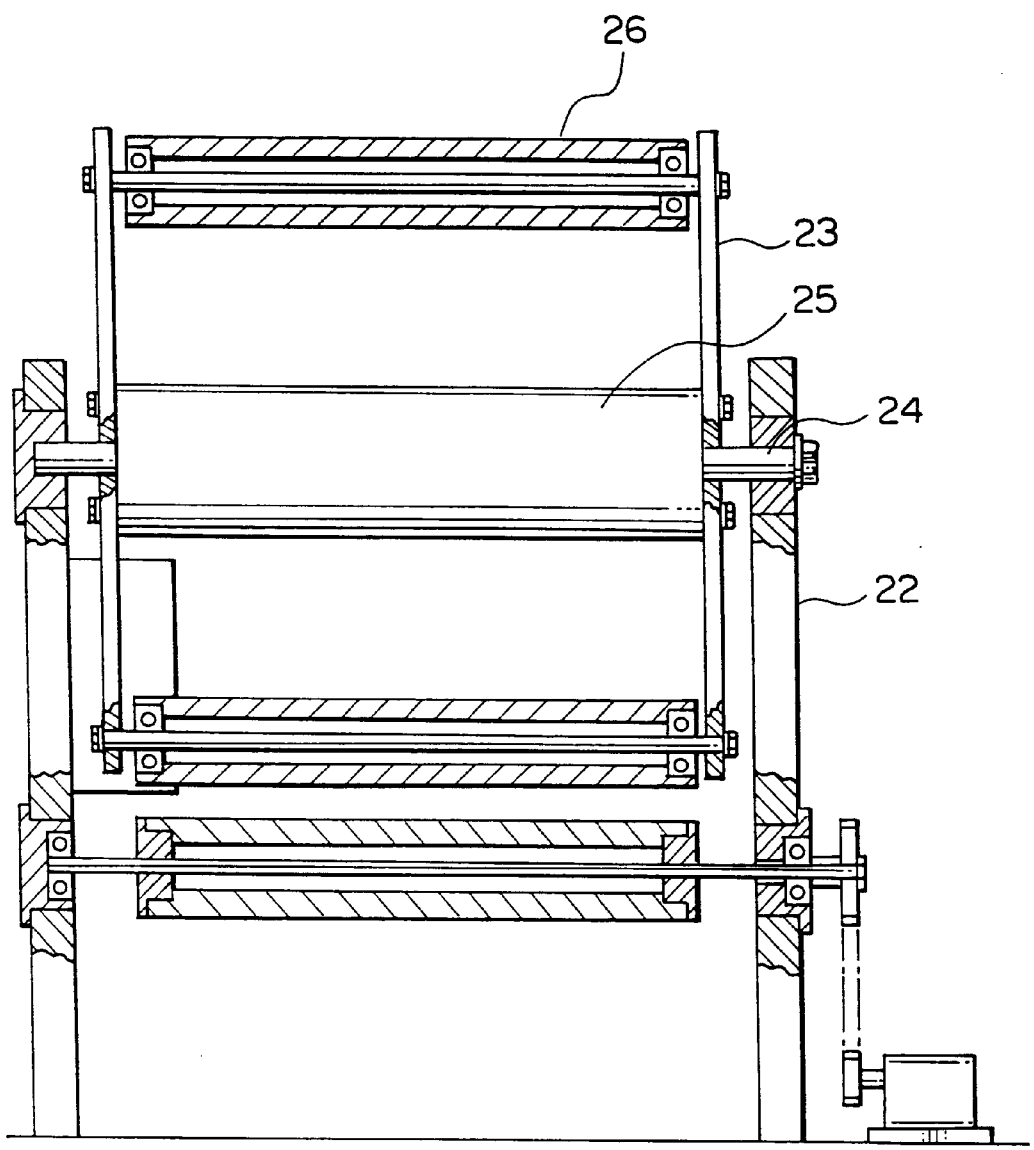
FIG. 3 shows a front view in cross section of the second embodiment of the present invention.

In a second embodiment, shown in FIG. 3, each planetary roller 26 is supported at both sides of it, while in the first embodiment, shown in FIG. 2, each planetary roller 26 is supported at just one side of it.

A rotatable wheel 23 is supported by a frame 22. The main shaft of the wheel 23 is equipped with a motor pulley 25. The rotation of the motor pulley 25 causes each planetary roller 26 to revolve along an orbit. Since the configuration of the conveying device is the same as that in the first embodiment, we do not explain it.

Figure 5:
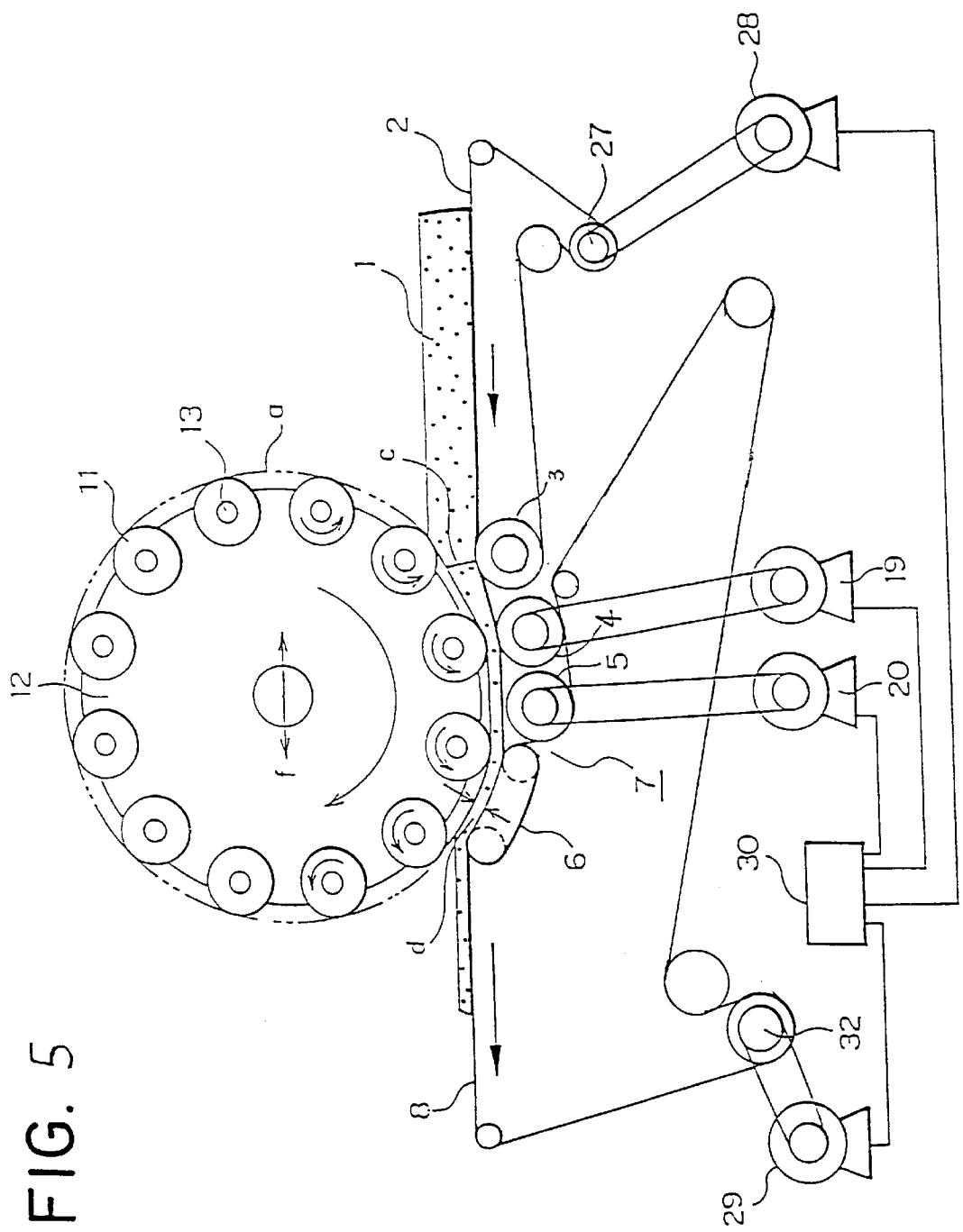
FIG. 5 shows a side view of the third embodiment of the present invention.

In a third embodiment, shown in FIG. 5, the belt of the discharge conveyor 8 is also trained over four guide rollers. The belt of the supply conveyor 2 is also trained over the rollers 3. Therefore, the roller 3 can be driven through the pulley 27 by the motor 28. The speeds at which the rollers 3, 4, and 5 rotate are gradually increased in the conveying direction. This can be carried out by the inverter 30. In this case, a plurality of rollers comprises rollers 4 and 5.

In the above embodiments, the speeds that the rollers 11 revolve can be set at 30 to 70 m/minute. The planetary rollers 11 and the rollers 3, 4, and 5 beat about 1000 times/minute on the bread dough 1. It readily and temporarily shows a fluidity due to the thixotropic effect. Therefore, an efficient stretching that is unobtainable by the conventional stretching method can be obtained.

The Effects of the Invention

As explained above, when bread dough having a high viscosity and high elasticity is stretched, the thixotropic effect causes a temporary fluidity to occur in it. This leads to the bread dough being stretched while it is under a low pressure. Further, this leads to the enhanced stretching action due to the different speeds that the rollers 3, 4, and 5 of the conveyor 7 rotate. Furthermore, a continuous and thin sheet of bread dough can be readily obtained under a low pressure, without the gluten tissue being broken. The arcuate plate provides a continuous conveying surface positioned downstream of the plurality of rollers. Therefore, the arcuate plate can function together with the planetary rollers to make uniform the stretched bread dough. Thus, the efficiency for stretching bread dough can be improved. Also, the bread dough has a uniform thickness and inner layers that include no large bubbles.

What is claimed is:

1. An apparatus for stretching bread dough comprising:
   a rotating member that includes a multiplicity of planetary rollersw that revolve along a circular orbit, each planetary roller being freely rotatable about its axis,
   a conveying device below said rotating member and including a plurality of rollers to define a gap with said planetary rollers, the dough being pressed in said gap, said gap gradually narrowing from an inlet for bread dough to an outlet for the bread dough,
   a speed-setting device for individually controlling the rotational speed of at least some of the plurality of rollers of the conveying device such that the rotational speed of the plurality of rollers of the conveying device gradually increases from the inlet to the outlet of said gap,
   a conveyor belt positioned downstream of the plurality of rollers of the conveying device to convey the bread dough from a roller of the plurality of rollers located at the outlet of said gap, and
   an arcuate plate positioned below both the rotating member and the conveyor belt at a fixed location, the bread dough being conveyed by the conveyer belt supported on the arcuate plate while the planetary rollers of said rotating member impart vibrations to the bread dough.

2. The apparatus of claim 1, wherein the speed of the conveyor belt is the same as that of the roller of the plurality of rollers that is located at the outlet of said gap.

3. The apparatus of claim 1, wherein the speed of the conveyor belt is faster than that of the roller of the plurality of rollers that is located at the outlet of said gap.

* * * * *

UNITED STATES PATENT AND TRADEMARK OFFICE
CERTIFICATE OF CORRECTION

PATENT NO. : 6,257,861 B1 Page 1 of 1
DATED : July 10, 2001
INVENTOR(S) : Michio Morikawa It is certified that error appears in the above-identified patent and that said Letters Patent is hereby corrected as shown below:

<u>Column 6, claim 1,</u>
Lines 15-16, "planetrary rollersw" should read -- planetary rollers --.

Signed and Sealed this

Fifteenth Day of January, 2002

Attest:

JAMES E. ROGAN
*Attesting Officer*  *Director of the United States Patent and Trademark Office*